UNITED STATES PATENT OFFICE.

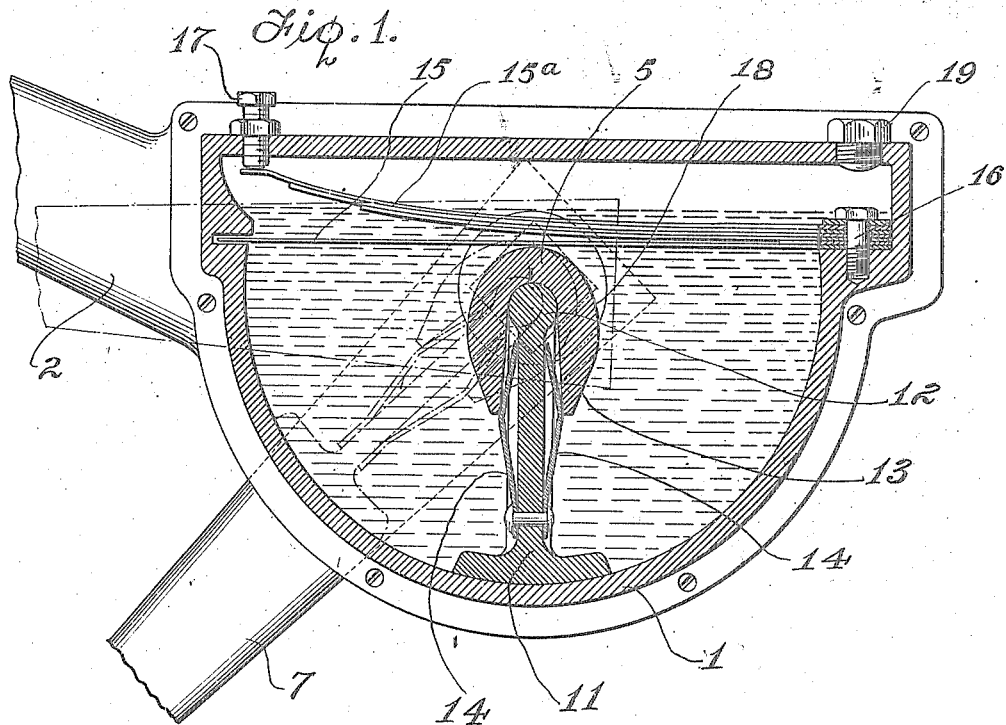
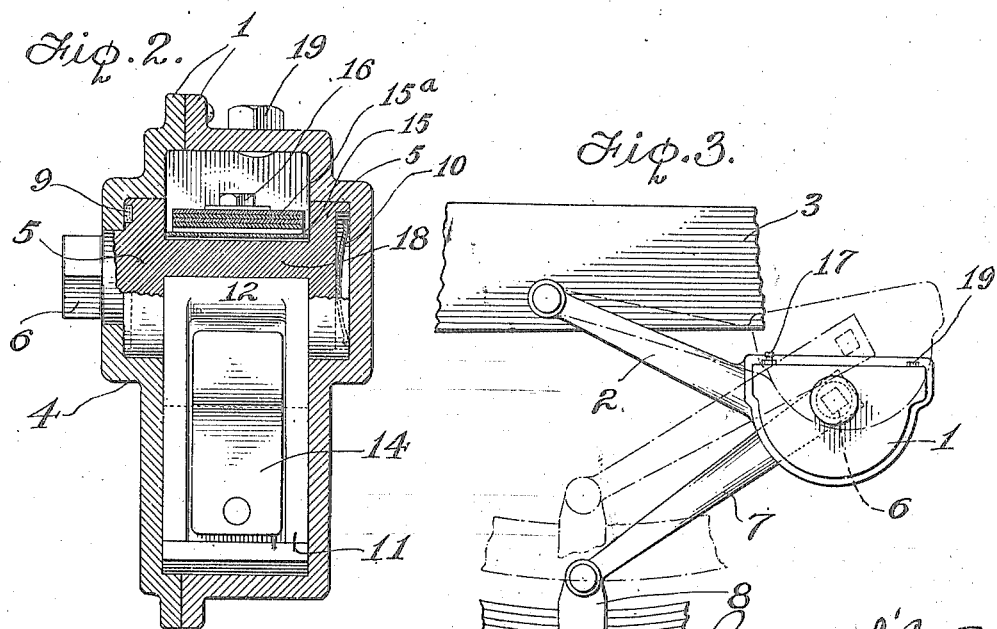

RUSSELL S. CARTER, OF HEWLITT, NEW YORK.

SHOCK-ABSORBER.

1,273,329.     Specification of Letters Patent.     Patented July 23, 1918.

Application filed January 27, 1916. Serial No. 74,529.

*To all whom it may concern:*

Be it known that I, RUSSELL S. CARTER, a citizen of the United States, residing at Hewlitt, in the county of Nassau and State of New York, have invented the following described Improvements in Shock-Absorbers.

The invention is an improvement in that particular kind of shock absorber which utilizes both the elastic resistance of a spring and the resistance to flow of a confined liquid in absorbing or suppressing shocks between the spring-connected parts of automobiles or other vehicles or devices, and consists in the relative arrangement and coöperation of the spring-yielding member and the liquid flow passage and in various details appertaining to such arrangement, as hereinafter more fully set forth and particularly pointed out in the appended claims.

The accompanying drawings forming part hereof,

Figure 1 is a sectional view of the liquid-containing chamber of a shock absorber embodying my invention;

Fig. 2 is a cross-section of Fig. 1 in the plane of the piston of that figure but showing the piston itself in elevation; and Fig. 3 is a small scale detail identifying the manner of connecting the shock absorber to the automobile or the parts between which shock is to be absorbed.

The device comprises a two-part casing 1 consisting of a body and a cover, bolted together as indicated in Fig. 2, to form a liquid-containing chamber within them. This casing is provided with an attachment arm 2 intended to be pivotally connected to one of the parts between which shock is to be absorbed, as, for example, the side girder 3 of an automobile frame. The bottom and cover parts of the casing 1 are formed with recesses 4, or otherwise shaped to constitute the journal seat for a hub 5 and the casing cover plate is apertured to allow the reduced end 6 of the hub to project to the exterior, where the hub is squared or otherwise shaped for rigid connection to the attachment arm 7, which latter is intended to be pivotally connected with the other one of the parts between which shock is to be absorbed,—for example, the axle or spring shackle 8 of an automobile chassis. The end face of the hub shoulder adjacent the reduced extension 6, is grooved and fitted with a packing ring 9, engaging the inner face of the casing wall to prevent leakage, and the hub as a whole is urged in the direction to compress this packing, by a dished spring 10 seated in a recess in its opposite end and bearing against the end of the hub recess in the casing. The pressure of this spring suffices to prevent leakage of the contained liquid when the device is idle; at other times the liquid in the casing, being under pressure, finds its way to the spring recess and adds its pressure to that of the spring to assist in sealing the joint against leakage. The hub as thus mounted supports and serves to impart motion to a piston 11, the free end of which is provided with a curved foot in sliding engagement with the circular wall of the casing, which wall is concentric to the axis of the hub throughout the portion engaged by the piston. The piston is connected with the hub through a form of lost motion connection, represented in the present case by a cylindrical enlargement 12 on the hub end of the piston, seated in a socket in the hub, in which it may turn through a small angle, as limited by the side walls 13 of the socket, which are extended far enough toward the swinging end of the piston to constitute an adequate power-transmitting abutment therewith after the lost motion has been taken up. The piston is normally centered with relation to the hub and its socket by a pair of leaf springs 14 riveted thereon and constituting buffers between the abutment members 13 and the piston on either side.

It will be evident that change of the angular relation of the attachment arms 2 and 7, such as results from the action of the vehicle springs may cause the piston member 11 to oscillate in the casing and displace the liquid therein accordingly, although minor vibrations will result merely in the oscillation of the hub without appreciably moving the piston, on account of the lost motion. The flow passage through which the liquid moves from one side of the piston to the other, is provided adjacent the hub and preferably on its opposite side from the piston member 11, and according to the present invention this passage is provided between an elastic chamber wall 15 and the surface of the hub, the said wall being disposed parallel with the direction of flow past the hub and adapted to yield laterally to such flow, in accordance with the suddenness of the shock or the pressure imparted thereby to the liquid. The flow passage is thus continually subject to the restrictive effect of the elastic wall 15 and such effect is made appreciable upon the action of the vehicle springs by virtue of a heavy laminated spring member 15$^a$ placed directly above it and in effect forming part of the said wall. This composite elastic wall member 15—15$^a$ extends across the casing, being permanently secured thereto at one end by the bolt or bolts 16, and free to play thereon at its other end, and the pressure it exerts upon the liquid flowing past the hub is subject to control by the set screw 17, which is accessible from the exterior of the casing. The said elastic wall member constitutes one of the lateral confines of the flow passage from one side of the piston to the other. The surface 18 of the hub itself forms the other side of said passage and this surface is curved eccentrically to the axis of the hub, after the manner of a cam, so that as the piston departs from its midposition (shown in Fig. 1) the said surface operates to close or restrict the passage, thereby imposing an increasing resistance to flow and a greater deflection of the elastic wall, such action taking effect in both directions of movement of the piston and serving to produce a minimum flow resistance throughout minor piston oscillations, increasing to maximum as the angle of oscillation increases. It will be understood that the elastic wall member 15—15$^a$ as thus deflected by the liquid, imparts its resilience in substantial degree to the relative movement of the attachment arms 2 and 7, being comparable in stiffness and weight to the springs of the vehicle itself, and exposing a surface of considerable area subject to the pressure of the liquid, indicated in the present case as a slightly larger area than that of the piston itself. The resulting resilient effect gives the shock absorber an action that is best identified as a live resistance in distinction from other liquid dash-pot types of shock absorbers already known in the art, and provides a desirable and highly effective means for eliminating the transmission of shock from the running gear to the body of the vehicle. The liquid-containing casing is filled nearly full, with liquid, such as castor oil, through a filling hole at the top, which is normally closed by a screw plug 19.

It will be apparent that the elastic chamber wall of the casing may be constructed in other ways than that shown in the drawings, although the design shown is preferred because of its simplicity and the ability to make it as stiff as required by the selection of spring leaves of different number or thickness. It is also immaterial whether the said elastic wall be secured to the casing in the manner shown or otherwise supported thereon or therein to give the same effect, and it will be understood that various modifications in proportion, arrangement and general design of the device shown may be made without departing from the invention.

I claim:

1. A shock absorber comprising a nonyielding piston member, a liquid-confining chamber wherein liquid may flow from one side of the piston to the other, and an elastic wall fixed to said chamber and controlling the flow through said passage and having an area exposed to the pressure of said liquid substantially equal to the area of the piston.

2. A shock absorber comprising a liquid-containing casing, a hub-mounted rotary piston therein, and a stiff spring-yielding wall adjacent the hub end of the piston, having an area exposed to the liquid pressure which is substantially equal to the piston area, said wall being mounted to yield variably to accommodate liquid flow from one side of the piston to the other, and means for connecting said piston and casing, respectively, to the parts between which shock is to be absorbed.

3. A shock absorber comprising a liquid-containing casing, a hub-mounted piston therein, and a stiff, spring-yielding wall fixed to said casing adjacent the hub of the piston and providing therewith a resiliently restricted flow passage from one side of the piston to the other.

4. A shock absorber comprising a liquid-containing chamber, a piston therein, and an elastic chamber wall opposing displacement of the liquid, said wall comprising superposed spring leaves and exposing an area subject to the pressure of the liquid which is substantially equal to the piston area.

5. In a shock absorber, the combination of a liquid-containing chamber, a slotted hub journaled therein, a rotary piston member having its blade portion within the slot and held therein by the engagement of its free end with said chamber whereby a limited lost motion is provided between hub and piston, and attachment arms on said chamber and hub, respectively.

6. A vehicle shock absorber comprising a liquid-containing casing, a non-flexing piston therein adapted to cause the liquid to flow from one side to the other side thereof, and an elastic chamber wall extending parallel with the said direction of flow and adapted to yield in proportion to the liquid pressure.

7 A shock absorber comprising a liquid-containing casing having a spring-yielding chamber wall forming the lateral boundary of a liquid flow passage from one side of the casing to the other, a piston member in said casing, and means whereby movement of the piston from its mid-position tends to restrict the said flow passage.

In testimony whereof, I have signed this specification in the presence of a witness.

RUSSELL S. CARTER.

Witness:
    H. G. KIMBALL.